Figure 1:
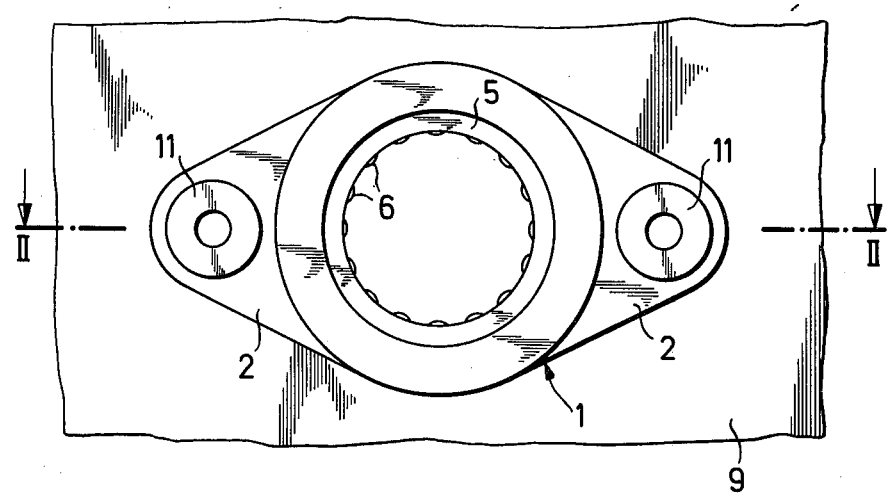

United States Patent [19]
Pflugner et al.

[11] 3,912,347
[45] Oct. 14, 1975

[54] DIE CAST BEARING HOUSING AND BEARING THEREOF
[75] Inventors: Wolfgang Pflugner; Jurgen Rabe, both of Herzogenaurach, Germany
[73] Assignee: Industriewerk Schaeffler OHG, Herzogenaurach, Germany
[22] Filed: Apr. 1, 1974
[21] Appl. No.: 456,895

[30] Foreign Application Priority Data
June 8, 1973  Germany.................... 7321526[U]

[52] U.S. Cl............. 308/236; 308/178; 308/207 R; 308/212
[51] Int. Cl.² .......................................... F16C 33/30
[58] Field of Search.... 308/236, 178, 189 R, 207 R, 308/193, 194, 202, 212

[56] References Cited
UNITED STATES PATENTS
2,277,635  3/1942  Delaval-Crow ................. 308/178 X
2,731,575  1/1956  Hershberger................. 308/189 R X
2,858,174  10/1958  Mitchell .............................. 308/178
3,369,378  2/1968  Miller ............................ 308/236 X FOREIGN PATENTS OR APPLICATIONS
333,736  8/1930  United Kingdom................. 308/236

Primary Examiner—M. Henson Wood, Jr.
Assistant Examiner—Randolph A. Reese
Attorney, Agent, or Firm—Hammond & Littell

[57] ABSTRACT

A bearing comprising a die cast bearing housing made of plastic or metal having therein a central bore and at least two lateral bores for securing the housing to a surface and a roller bearing disposed in the central bore consisting of an outer race and rollers arranged therein, the outer race extending beyond the housing face which is in contact with the surface on which it is to be mounted.

1 Claim, 2 Drawing Figures

DIE CAST BEARING HOUSING AND BEARING THEREOF

STATE OF THE ART

Bearing housings of this type are frequently used in combination with roller bearings or overrunning clutches having a relatively small diameter, for example, in office machines, and are secured therein on metal walls. A problem which is encountered here is that the fastening of the bearing housing must be effected in a very accurate position to ensure that the axis of the roller bearing or overrunning clutch received in the bearing housing is aligned exactly with the axis of the shaft mounted in this bearing. For this reason, the bores in the housing walls necessary for the fastening of these bearing housings had to be precision-made, or shoulder screws or -rivets had to be used for fastening the bearing housings. These rather complicated measures greatly complicated and increased the costs of and restricted the application of such flanged bearing housings whose production is in itself rather inexpensive.

OBJECTS OF THE INVENTION

It is an object of the invention to provide novel bearing constructions which can be easily installed by simple and inexpensive measures.

This and other objects and advantages of the invention will become obvious from the following detailed description.

THE INVENTION

The novel bearing of the invention is comprised of a die cast bearing housing made of plastic or metal having therein a central bore and at least two lateral bores for securing the housing to a surface and a roller bearing disposed in the central bore consisting of an outer race and rollers arranged therein, the said outer race extending beyond the housing face which is in contact with the surface on which it is to be mounted.

Figure 2:
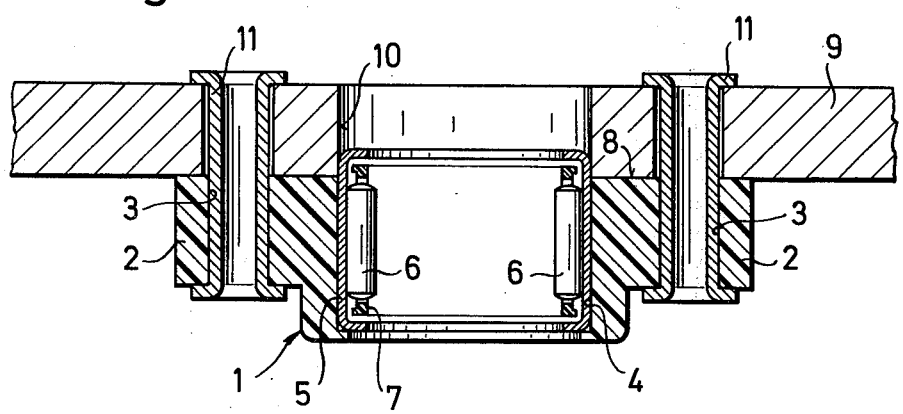

In this construction, it is only necessary to arrange a single, accurately positioned bore in the housing wall in which this bearing housing is to be secured and which is adapted in its diameter to the outside diameter of the outer race of the roller bearing or of the overrunning clutch. The exact positioning of the bearing housing is then effected by the outer race itself, while the lateral fastening bores for the bearing housing need not be very accurate in their position and size. Referring now to the drawings:

FIG. 1 is a plain view of one embodiment of the invention and FIG. 2 is a cross-section of the same embodiment taken along the line II—II.

In the embodiment of FIGS. 1 and 2, the bearing is comprised of bearing housing 1 provided with lateral extending lugs 2 having therein fastening bores 3. The central bore 4 of housing 1 has arranged therein a roller bearing consisting of outer race 5 on which needle bearing 6 in a cage 7 roll. The outer race 5 partially projects out of bore 4 beyond end face or surface 8 of housing 1 which bears against housing wall 9 when in position. The race 5 engages bore 10 of the housing wall which is adapted to the outside diameter of race 5 and is therefore centered in bore 10. Housing 1 is secured to housing wall 9 by hollow rivets 11 which may be replaced by screws or other suitable fastening means.

Various modifications of the bearings of the invention may be made without departing from the spirit or scope thereof. For example, if the bearing is an overrunning clutch, the inner surface of race 5 will be provided with camming surfaces. It is to be understood that the invention is to be limited only as defined in the appended claims.

We claim:

1. A bearing comprised of a die cast bearing housing made of plastic or metal having therein a central bore and at least two lateral bores for securing the housing to a surface and a roller bearing disposed in the central bore consisting of an outer race and rollers arranged therein, the said outer race extending beyond the housing face which is in contact with the surface on which it is to be mounted.

* * * * *